(12) United States Patent
Aono

(10) Patent No.: US 8,589,500 B2
(45) Date of Patent: Nov. 19, 2013

(54) E-MAIL RECEPTION APPARATUS AND E-MAIL RECEPTION METHOD

(75) Inventor: Tomotake Aono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/121,332

(22) PCT Filed: Sep. 28, 2009

(86) PCT No.: PCT/JP2009/066816
§ 371 (c)(1),
(2), (4) Date: Jun. 15, 2011

(87) PCT Pub. No.: WO2010/035841
PCT Pub. Date: Apr. 1, 2010

(65) Prior Publication Data
US 2011/0246589 A1    Oct. 6, 2011

(30) Foreign Application Priority Data

Sep. 29, 2008  (JP) ................................. 2008-250682

(51) Int. Cl.
*G06F 15/16* (2006.01)
(52) U.S. Cl.
USPC ........................................................ 709/206
(58) Field of Classification Search
USPC ........................................................ 709/206
See application file for complete search history.

(56) References Cited

U.S. PATENT DOCUMENTS

| | | | | |
|---|---|---|---|---|
| 6,487,586 B2 * | 11/2002 | Ogilvie et al. | ................. | 709/206 |
| 6,704,772 B1 * | 3/2004 | Ahmed et al. | ................. | 709/207 |
| 7,062,536 B2 * | 6/2006 | Fellenstein et al. | ........... | 709/206 |
| 7,359,936 B2 * | 4/2008 | Gruen et al. | .................. | 709/203 |
| 7,392,280 B2 * | 6/2008 | Rohall et al. | .................. | 709/201 |
| 7,752,279 B2 * | 7/2010 | Hardy et al. | .................. | 709/207 |
| 7,849,147 B2 * | 12/2010 | Rohall et al. | ................. | 709/206 |

(Continued)

FOREIGN PATENT DOCUMENTS

| | | |
|---|---|---|
| JP | 08-335951 A | 12/1996 |
| JP | 2001-243180 A | 9/2001 |

(Continued)

OTHER PUBLICATIONS

Outlook 2010 Issue: Add option for "Do not group conversations with no subject" or Add option for "only group conversations from email within days," Aug. 3, 2010, http://social.technet.microsoft.com/Forums/office/en-US/cefa4e11-963e-4b4b-8387-6fb71d1fea4f/outlook-2010-issue-add-option-for-do-not-group-conversations-with-no-subject-or-add-option-for.*

(Continued)

*Primary Examiner* — Alicia Baturay
(74) *Attorney, Agent, or Firm* — Procopio, Cory, Hargreaves & Savitch LLP

(57) ABSTRACT

Provided is a communication apparatus (e-mail reception apparatus) capable of storing more contents of necessary e-mails even if only a limited number of e-mails can be stored. An e-mail reception apparatus has a reception unit for receiving an e-mail, a memory unit for storing the e-mail received, and a control unit, if a predetermined event is detected, for controlling to combine e-mails meeting a combination rule among the e-mails stored in the memory unit, to store a combination e-mails in the memory unit and to delete original e-mails.

9 Claims, 8 Drawing Sheets

(56) References Cited

U.S. PATENT DOCUMENTS

| | | | |
|---|---|---|---|
| 7,865,560 B2 * | 1/2011 | Rohall et al. | 709/206 |
| 7,929,562 B2 * | 4/2011 | Petrovykh | 370/429 |
| 2002/0091772 A1 * | 7/2002 | Yong | 709/206 |
| 2003/0101065 A1 * | 5/2003 | Rohall et al. | 705/1 |
| 2005/0144279 A1 * | 6/2005 | Wexelblat | 709/225 |
| 2006/0200528 A1 * | 9/2006 | Pathiyal | 709/206 |
| 2006/0206569 A1 * | 9/2006 | Heidloff et al. | 709/206 |
| 2006/0212527 A1 | 9/2006 | Tonegawa et al. | |
| 2006/0212528 A1 | 9/2006 | Tonegawa | |
| 2007/0072564 A1 * | 3/2007 | Adams | 455/115.1 |
| 2008/0071865 A1 * | 3/2008 | Dutta | 709/206 |
| 2008/0301250 A1 * | 12/2008 | Hardy et al. | 709/207 |
| 2010/0030798 A1 * | 2/2010 | Kumar et al. | 707/102 |
| 2010/0076989 A1 * | 3/2010 | Jakobson | 707/758 |
| 2010/0262917 A1 * | 10/2010 | Hardy et al. | 715/735 |
| 2011/0231499 A1 * | 9/2011 | Stovicek et al. | 709/206 |

FOREIGN PATENT DOCUMENTS

| | | |
|---|---|---|
| JP | 2002-014903 A | 1/2002 |
| JP | 2002-312375 A | 10/2002 |
| JP | 2005-295600 A | 10/2005 |
| JP | 2006-259916 A | 9/2006 |
| JP | 2006-293998 A | 10/2006 |
| JP | 2006-350833 A | 12/2006 |
| JP | 2007-072689 A | 3/2007 |
| WO | 2008/001900 A1 | 1/2008 |
| WO | 2008/126296 A1 | 10/2008 |

OTHER PUBLICATIONS

International Search Report dated Dec. 28, 2009 issued by the Japanese Patent Office for International Application No. PCT/JP2009/066816.

Notice of Reasons for Refusal dated Jun. 26, 2012, issued in counterpart Japanese Application No. 2010-530892.

Notice of Grounds for Rejection dated Mar. 27, 2012, issued in counterpart Korean Application No. 10-2011-7007091.

Official Decision of Rejection dated Sep. 18, 2012, issued in counterpart Japanese Application No. 2010-530892.

First Office Action dated Jun. 6, 2013, issued in counterpart Chinese Application No. 200980138208.7.

* cited by examiner

FIG. 6

<Inbox>

| Sender |
|---|
| User B |
| Time |
| 2008/2/14  14:50 |
| Subject |
| Today's Drinking Party |
| Mail |
| Where are you ? |

— D21

| Sender |
|---|
| User B |
| Time |
| 2008/2/14  14:55 |
| Subject |
| Re;Re;Today's Drinking Party |
| Mail |
| You are running late ! Today's drinking party at 3pm. I'm at YY station now. I'll be waiting for you, so hurry up ! Who's coming today ? |

— D23

| Sender |
|---|
| User B |
| Time |
| 2008/2/14  23:01 |
| Subject |
| Re;Re;Re;Re; Today's Drinking Party |
| Mail |
| It was fun at the drinking party today. |

— D25

| Sender |
|---|
| User B |
| Time |
| 2008/2/14  23:05 |
| Subject |
| |
| Mail |
| Me too··· |

— D27

<Outbox>

| Recipient |
|---|
| User B |
| Time |
| 2008/2/14  14:53 |
| Subject |
| Re;Today's Drinking Party |
| Mail |
| Just passed XX station now··· |

— D22

| Recipient |
|---|
| User B |
| Time |
| 2008/2/14  15:03 |
| Subject |
| Re;Re;Re; Today's Drinking Party |
| Mail |
| Sorry. I don't know who's coming today. Sorry. I'll be there in a minute. |

— D24

| Recipient |
|---|
| User B |
| Time |
| 2008/2/14  23:03 |
| Subject |
| Tired··· |
| Mail |
| I'm tired. |

— D26

| Recipient |
|---|
| User B |
| Time |
| 2008/2/14  23:08 |
| Subject |
| Re;Untitled |
| Mail |
| I'm off to bed. Good night. |

```
Y|▮▮▮                    11:00
      Recipient/Sender
User B
          Time
2008/2/14    14:50~23:08
         Subject
Today's Drinking Party+I'm Tired···
      Combination Mail Sender:User B   Time:14:50
Subject:Today's Drinking Party
Mail:
Where are you ?
--------------

Recipient:User B   Time:14:53
Subject:Today's Drinking Party
Mail:
Just passed XX station now···
--------------

Sender:User B   Time:14:55
Subject:Re;Re;Today's Drinking Party
Mail:
You are running late !
Today's drinking party
at 3pm. I'm at YY station
now.
I'll be waiting for you,
so hurry up !
Who's coming today ?
--------------

Recipient:User B   Time:15:03
Subject:Re;Re;Re;Today's Drinking Party

Mail:
Sorry. I don't know who's coming today.

Sorry. I'll be there in a minute.

--------------

Sender:User B   Time:23:01
Subject:Re;Re;Re;Re,Today's Drinking Party
Mail:
It was fun at the drinking party today.
--------------

Recipient:User B   Time:23:03
Subject:Tired
Mail:
I'm tired.
--------------

Sender:User B   Time:23:03
Subject:
Mail:
Me too
--------------

Recipient:User B   Time:23:08
Subject:Re;Untitled
Mail:
I'm off to bed.
Good night.
--------------
```

(b) D32

```
Y|▮▮▮                    11:00
      Recipient/Sender
User B
          Time
2008/2/14    14:50~23:08
         Subject
Today's Drinking Party+I'm Tired···
      Combination Mail Sender:User B   Time:14:50
 Subject:Today's Drinking Party
--------------

Recipient:User B   Time:14:53
 Subject:Re;Today's Drinking Party
--------------

Sender:User B   Time:14:55
 Subject:Re;Re;Today's Drinking Party
--------------

Recipient:User B   Time:15:03
 Subject:Re;Re;Re;Today's Drinking Party
--------------

Sender:User B   Time:23:01
 Subject:Re;Re;Re;Re;Today's Drinking Party
--------------

Recipient:User B   Time:23:03
 Subject:Tired
--------------

Sender:User B   Time:23:05
 Subject:
--------------

Recipient:User B   Time:23:08
 Subject:Re;Untitled
--------------
```

Click Subject to View Contents.

E-MAIL RECEPTION APPARATUS AND E-MAIL RECEPTION METHOD

CROSS REFERENCE TO RELATED APPLICATION

This application claims priority to and the benefit of Japanese Patent Application No. 2008-250682 filed on Sep. 29, 2008, the entire contents of which are incorporated herein by reference.

TECHNICAL FIELD

The present invention relates to e-mail reception apparatuses and e-mail reception methods. In particular, the present invention relates to e-mail reception apparatuses and e-mail reception methods capable of storing more contents of necessary e-mails, even if only a limited number of e-mails can be stored, by combining related e-mails, among e-mails transmitted or received, into one e-mail.

BACKGROUND ART

Conventionally, in a communication terminal capable of transmitting and receiving an e-mail (hereinafter, referred to simply as a "mail"), only a limited number of e-mails can be stored in storage units, generally called inbox and outbox (mail boxes), because of a limitation of a memory mounted in the communication terminal. Therefore, if the number of mails in the mail box exceeds a storage limitation (maximum number of mails that can be stored) because of reception or transmission of a new mail, a conventional communication terminal deletes an oldest mail stored, unless a user performs mail protection processing or the like, for example. In addition, in the conventional communication terminal, even a mail with only a small content (hereinafter, referred to as a "short message" for a simple description) such as just "OK", "Where are you?" or the like, for example, is counted as one mail. Accordingly, if such short messages are exchanged repeatedly, it is easy to reach the maximum number of mails that can be stored in the mail boxes of the conventional communication terminal.

On the other hand, in order to review exchanged mails to check a direction of a conversation, the user needs to read every single mail by opening the inbox and the outbox alternately. Such a reviewing process incur a time-consuming task to the user, especially if the mails comprises a repetition of the short messages as described above, as the user needs to change the mails to view frequently.

As a conventional art capable of handling such a condition, there is disclosed a scheme to secure a memory capacity by deleting or reducing a size of a mail satisfying a predetermined condition such as an old reception date, a less important content or the like, if the number of stored mails reaches the maximum number of mails that can be stored (for example, see Patent Document 1).

PRIOR ART DOCUMENT

Patent Document

Patent Document 1: Japanese Patent Laid-Open No. 8-335951

SUMMARY OF INVENTION

Technical Problem

However, in a case that a plurality of users exchange mails on one theme, if one of a series of mails on the theme is deleted as described in Patent Document 1, it is difficult for the user to keep track of the direction of the conversation when reviewing the mails afterwards. In addition, since a reduction of a size of a mail does not change the number of mails stored in the mail box, it still does not solve a problem that the number of transmitted and received mails reaches the maximum number of mails that can be stored.

Conventionally, many communication apparatuses can use a function to create a new mail quoting contents of a received mail. If the user keeps creating mails by using the function, the latest mail of a series of mails quotes contents of previous mails, which allows the user to figure out the direction of the conversation afterwards with this mail alone. However, the user may not always quote previous mails in creating a new mail and, in such a case it is difficult for the user to figure out the direction of the conversation from contents of the previous mails.

Accordingly, in order to solve problems described above, an object of the present invention is to provide a mail reception apparatus and a mail reception method with excellent usability capable of storing more contents of a series of necessary mails, even if only a limited number of mails can be stored, and allowing the user to easily review the series of mails.

Solution to Problem

In order to solve the above problems, a mail reception apparatus according to the present invention includes:
a reception unit for receiving a mail;
a memory unit for storing the mail received by the reception unit; and
a control unit, if detecting a predetermined event (an elapse of a predetermined time after reception of the mail, the number of stored mails reaches a certain amount, or the like), for controlling to combine mails meeting a combination rule among mails stored in the memory unit, to store a combination mail in the memory unit and to delete original mails (from the memory unit).

The mail reception apparatus according to one embodiment of the present invention is characterized in that
the combination rule is a rule for combining mails in association with a particular other party.

The mail reception apparatus according to another embodiment of the present invention is characterized in that
the combination rule is a rule for combining mails including a same character string in subjects.

The mail reception apparatus according to yet another embodiment of the present invention is characterized in that
the combination rule is a rule for combining mails of non-title (Untitled) received within a predetermined period.

The mail reception apparatus according to yet another embodiment of the present invention is characterized in that
the predetermined event is an event to detect that a number of mails stored in the memory unit exceeds a predetermined amount.

The mail reception apparatus according to yet another embodiment of the present invention is characterized in that
the predetermined event is an event occurred at every predetermined time.

The mail reception apparatus according to yet another embodiment of the present invention further includes a transmission unit for transmitting a mail, wherein
the memory unit further stores the mail transmitted by the transmission unit, and
the control unit controls to combine mails meeting the combination rule among transmitted and received mails stored in the memory unit, to store a combination mail in the memory unit and to delete original mails (from the memory unit).

Although the apparatus is used as solutions according to the present invention as described above, it is appreciated that the present invention can also be implemented by methods, programs and storage media storing programs. Hence, they are included within a scope of the present invention. Each step of the methods or programs uses an arithmetic processing unit such as a CPU, a DSP or the like in processing the data, as appropriate, which stores input data and processed or generated data in a storage device such as an HDD, a memory or the like.

For example, a mail reception method implementing the present invention as a method includes the steps of:
receiving a mail;
storing the mail received at the step of receiving; and
combining, if a predetermined event is detected, mails meeting a combination rule among the mails stored at the step of storing, storing a combination mail, and deleting original mails.

Effect of the Invention

According to the present invention, as described above, it is possible to store more contents of a series of necessary mails even if only a limited number of mails can be stored. Moreover, according to the present invention, it is possible to provide the mail reception apparatus (communication apparatus) and the mail reception method with excellent usability that allows a user to easily review the series of mails.

BRIEF DESCRIPTION OF DRAWINGS

FIG. 6 is a diagram illustrating a specific example of the mail combining processing;

FIG. 7 is a diagram illustrating another specific example of the mail combining processing.

DESCRIPTION OF EMBODIMENT

A mail reception apparatus according to one embodiment of the present invention will be described in detail with reference to the accompanying drawings. Although it is assumed to use a mobile terminal as the mail reception apparatus in the following description, the present invention is not limited to the mobile terminal. The present invention, as the mail reception apparatus, is widely applicable to electronic devices capable of receiving mails, such as a PDA (Personal Digital Assistance), a mobile electronic game device and the like. In addition, mails include message data such as SMS (Short Message Service) and the like.

Figure 1:
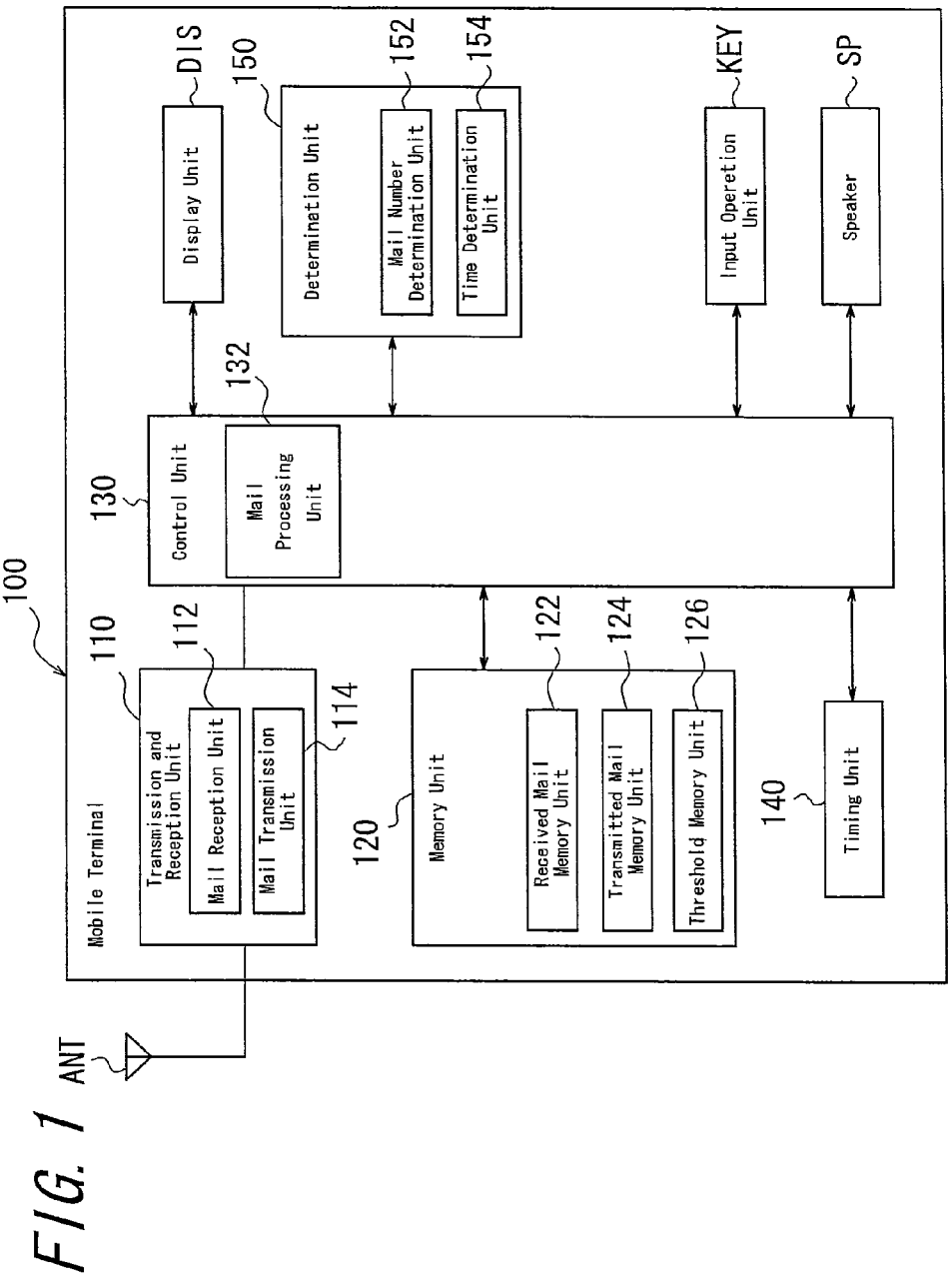
FIG. 1 is a functional block diagram illustrating a mobile terminal according to the present invention.

FIG. 1 is a schematic block diagram of a mobile terminal according to the present invention. A mobile terminal 100 has an antenna ANT, a transmission and reception unit 110, a memory unit (flash memory or the like) 120 and a control unit 130. The mobile terminal 100 further includes a timing unit 140, a determination unit 150, a display unit DIS, an input operation unit KEY and a speaker SP. The transmission and reception unit 110 has a mail reception unit 112 and a mail transmission unit 114. The memory unit 120 has a received mail memory unit 122, a transmitted mail memory unit 124 and a threshold memory unit 126. The control unit 130 has a mail processing unit 132. The determination unit 150 has a mail number determination unit 152 and a time determination unit 154.

Now, a function of each unit is described. The transmission and reception unit 110 transmits and receives signals with a communication counterpart (a base station or the like, for example). The mail reception unit 112 receives mails, whereas the mail transmission unit 114 transmits mails. The received mail memory unit (inbox) 122 stores received mails, whereas the transmitted mail memory unit (outbox) 124 stores transmitted mails. The threshold memory unit 126 stores a predetermined threshold in relation to a combination rule (detailed description thereof will be presented below). The mail processing unit 132 of the control unit 130 combines or deletes mails stored in the received mail memory unit 122 or the transmitted mail memory unit 124 based on the combination rule. The timing unit 140 keeps time. The mail number determination unit 152 determines whether the number of mails stored in the memory unit 120 exceeds a predetermined number. The time determination unit 154 determines whether a predetermined time to apply the combination rule has passed.

The display unit DIS may be a known display device such as, for example, a liquid crystal panel, an organic EL, an LED display, a field emission display or the like and displays a mail creation screen, contents of the mails transmitted and received, and the like. The input operation unit KEY may be, for example, a keypad, key buttons, a touch panel or the like and receives character inputs by a user in creating a mail.

Figure 2:
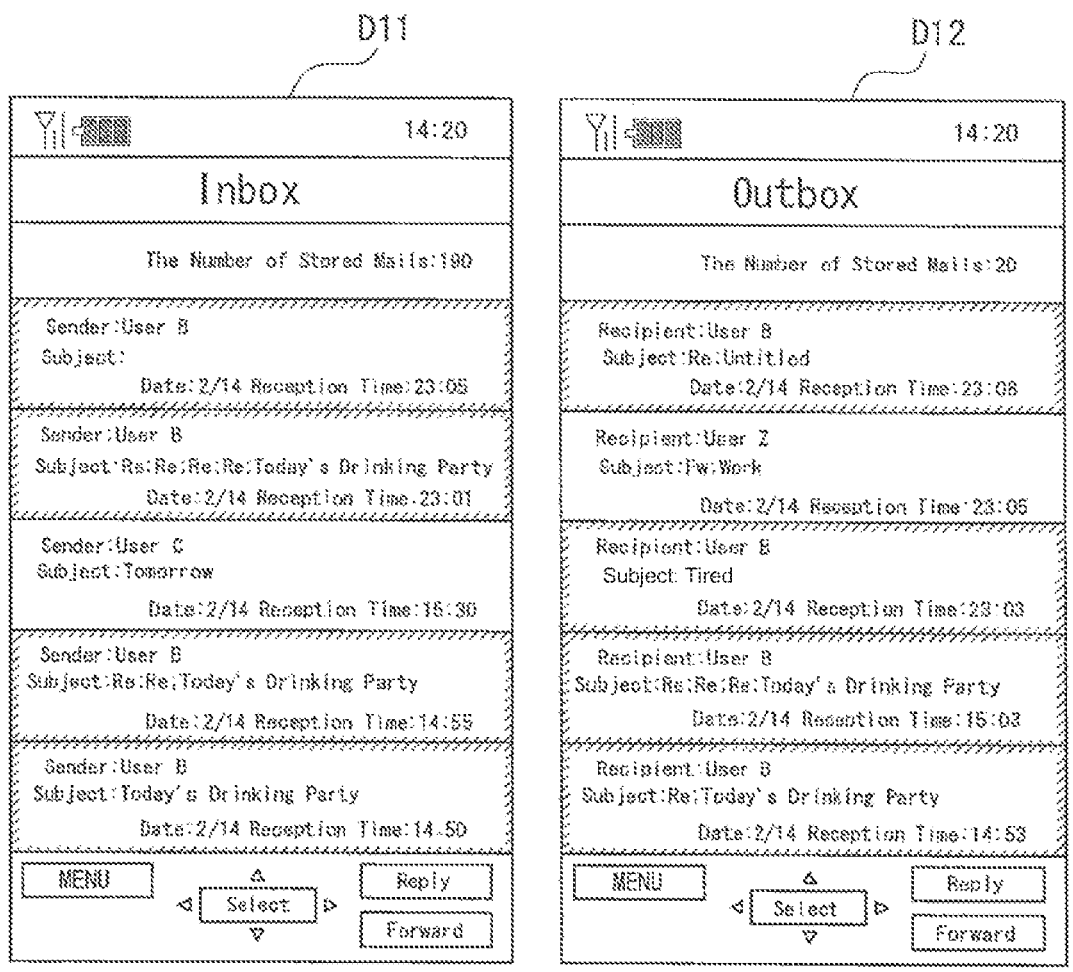
FIG. 2 is a diagram illustrating examples of display screens of a display unit DIS.

The followings are descriptions of mail combining processing by the mobile terminal 100 according to the present invention, to combine received mails and/or transmitted mails meeting the combination rule, with reference to flowcharts and schematic diagrams. FIG. 2 is a diagram illustrating examples of display screens of the display unit DIS displaying some of mails stored (contained) in the memory unit 120 and the number of stored mails. A display screen D11 displays latest mails stored in the received mail memory unit (inbox) 122 in reverse chronological order, whereas a display screen D12 displays latest mails stored in the transmitted mail memory unit (outbox) 124 in the same order. In the figure, mails surrounded by hatching have the same other party (here, a "user B") as "Sender" in the inbox and "Recipient" in the outbox. In embodiments described below, it is assumed that the mail combining processing is performed on the mails shown in FIG. 2, and that the mails surrounded by the hatching meet the combination rule.

First Embodiment

Figure 3:
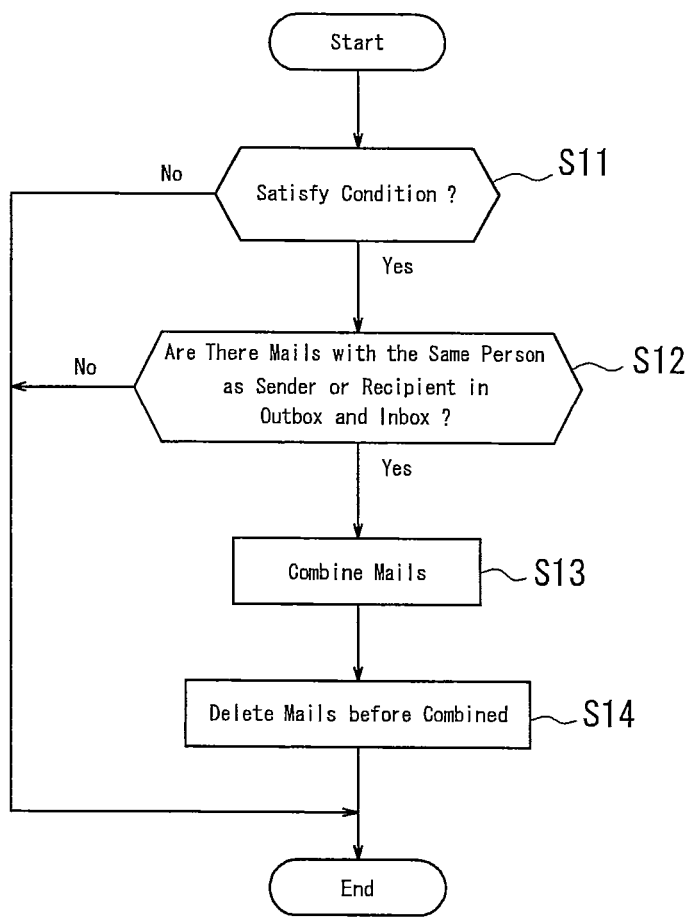
FIG. 3 is an exemplary flowchart of mail combining processing according to a first embodiment of the present invention.

FIG. 3 shows an exemplary flowchart of the mail combining processing according to a first embodiment of the present invention. According to the first embodiment, mails with the same other party as "Recipient" or "Sender", among the stored mails (received mails and/or transmitted mails), are combined. That is, according to the first embodiment, the combination rule as a condition to combine mails is "associated with a particular other party as a recipient or a sender". First, at step S11, the determination unit 150 determines whether a predetermined condition is satisfied (whether a predetermined event is detected). Here, the predetermined event is that a predetermined time has passed after previous mail combining processing or that the number of mails (stored mails) in the memory unit 120 exceeds a predetermined number, which are detected by the time determination unit 154 and the mail number determination unit 152, respectively. The predetermined time may be freely set to a week, a half month or the like, for example, by the user. In addition, it is preferred to set the predetermined number of stored mails less than the maximum number of mails that can be stored. According to the present embodiment, the maximum number is 200 and the predetermined number of stored mails used for detection of the predetermined event is 190.

As shown in FIG. 2, if the number of mails stored in the inbox reaches 190, the event that the number of stored mails exceeds the predetermined number is detected by the mail number determination unit 152 at step S11. Next, at step S12, the mail processing unit 132 determines whether there are a plurality of mails with the same other party as a recipient or a sender in the inbox and the outbox, that is, whether there are mails meeting the combination rule. If there are mails meeting the combination rule, the mail processing unit 132 combines them into a single combination mail at step S13. In the example in FIG. 2, a plurality of mails with the "user B" as a recipient or a sender, surrounded by the hatching, are stored in the outbox and the inbox, and these mails are combined and stored as a single combination mail in the memory unit 120. Then, at step S14, the mail processing unit 132 deletes original mails from the memory unit 120.

Although a specific example of combined mails (combination mail) will be described below, if the present invention is applied when there are 10 mails meeting the combination rule, for example, a single combination mail enables to refer contents of the 10 mails. In addition, since the original 10 mails are deleted from the memory unit 120, it is less likely for the number of stored mails to reach the maximum number of mails that can be stored. Accordingly, it reduces a risk to delete necessary mails in a conventional manner because the number of stored mails reaches the maximum number.

It is to be understood that it is not essential to have mails with the same other party as a recipient or a sender in both of the inbox and the outbox. That is, even if there is a plurality of mails with the same other party as a sender only in the inbox, these mails meet the "combination rule" and thus the mail combining processing is carried out at step S13. Similarly, even if there are a plurality of mails with the same other party as a recipient only in the outbox, these mails meet the "combination rule".

Second Embodiment

Figure 4:
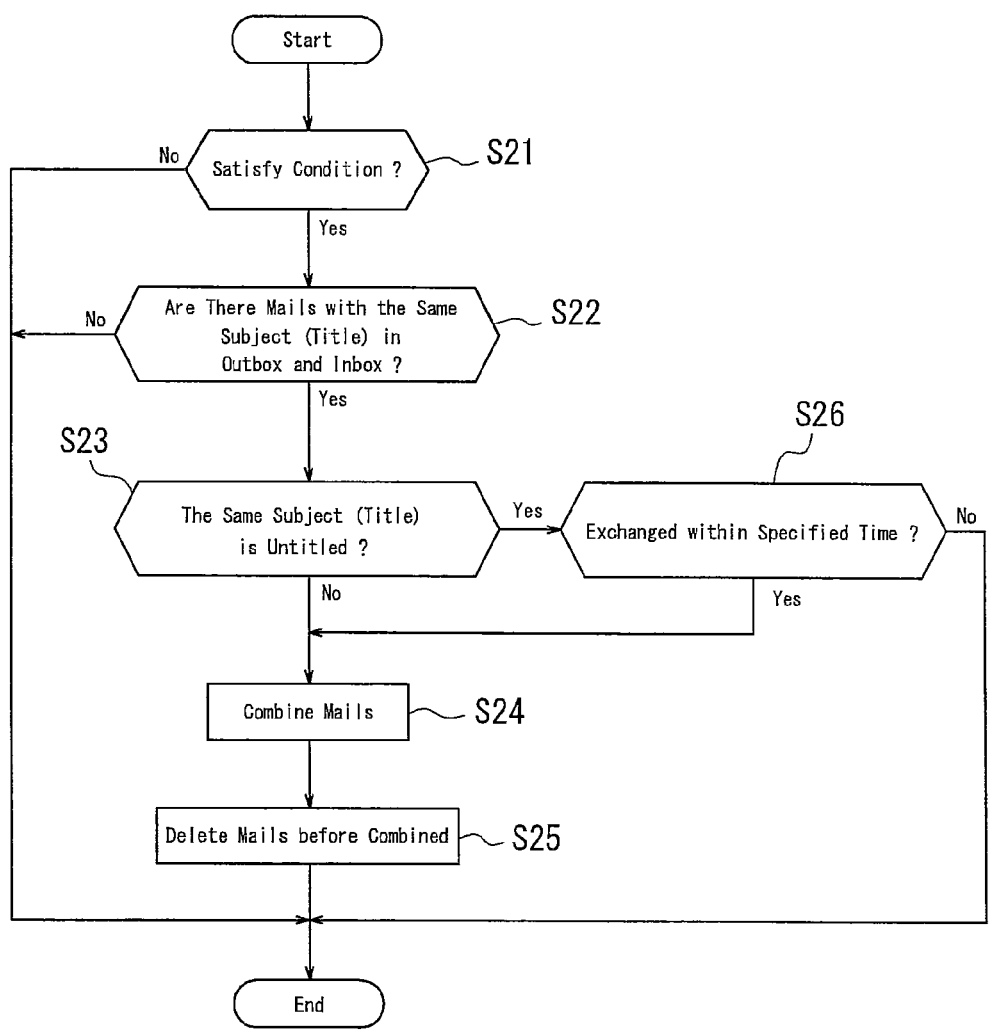
FIG. 4 is an exemplary flowchart of mail combining processing according to a second embodiment of the present invention.

FIG. 4 is an exemplary flowchart of mail combining processing according to a second embodiment of the present invention. According to the second embodiment, mails with the same subject (title) among the stored mails are combined. That is, according to the second embodiment, the "combination rule" is "including the same character string in a subject". In addition, if the subjects of mails are Untitled (non title), mails with reception times and/or transmission times within a predetermined time are combined. That is, in this case, the "combination rule" that "having subject of Untitled, and a transmission or reception time within the predetermined time" is also applied. First, at step S21, the determination unit 150 determines whether the predetermined condition is satisfied (whether the predetermined event is detected). Since this determination is the same as that according to the first embodiment, a description thereof is omitted. Next, at step S22, the mail processing unit 132 determines whether there are a plurality of mails with the same subjects (title) (mails including the same character string in the subjects) in the inbox and the outbox, that is, whether there are mails meeting the combination rule. At this time, characters such as "Re;", "Re;Re;" indicating a reply mail and "Fw;" indicating a forwarded mail included in the subjects are not counted.

If it is determined at step S22 that there are mails meeting the "combination rule", the mail processing unit 132 shifts to step S23 to determine whether the subjects (titles) of mails meeting the combination rule are Untitled (non title). Here, it is determined that the subject is Untitled (non title), if a character string such as "Untitled", "No title" or the like is included in the subject, if the characters "Re;" alone are included, or if the subject is blank. If it is determined at step S23 that the subjects are Untitled (non title), the mail processing unit 132 shifts to step S26 to determine whether a plurality of mails with the subjects of Untitled (non title) are exchanged (transmitted or received) within a predetermined time. That is, as to the received mails, it is determined whether reception times thereof are within the predetermined time, whereas, as to the transmitted mails, it is determined whether transmission times thereof are within the predetermined time. The predetermined time may be freely set to a day, two hours or the like, for example, by the user.

If it is determined at step S26 that the plurality of mails with the subjects of Untitled (non title) are exchanged within the predetermined time, or if it is determined at step S23 that the subjects are not Untitled (non title), the mail processing unit 132 shifts to step S24 to combine corresponding mails and to store them as a single combination mail. Then, at step S25, the mail processing unit 132 deletes original mails from the memory unit 120.

Although two "combination rules" such as "including the same character string in a subject" and "having the subject of Untitled and a transmission/reception time within a predetermined time" are combined in the above embodiment, the present invention is not limited thereto. That is, the "combination rule" may be only one of "having the subject of Untitled and a transmission/reception time within a predetermined time" and "including the same character string in a subject". In addition, in the same manner as the first embodiment, it is not essential to have the mails including the same subjects both in the inbox and the outbox but the combination rule according to the present invention is applied even if the mails including the same subjects are stored in only one of the inbox and the outbox.

Third Embodiment

Figure 5:
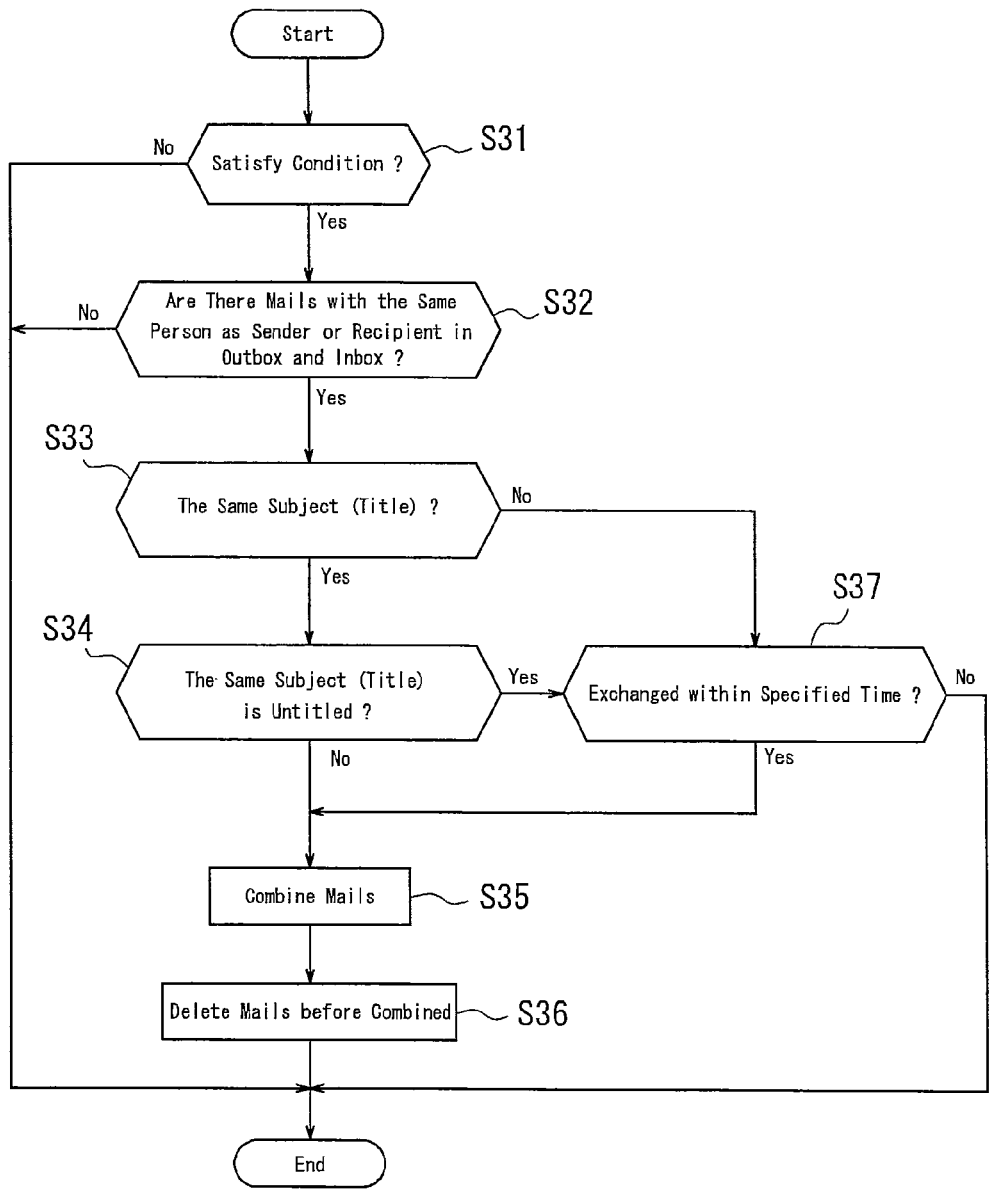
FIG. 5 is an exemplary flowchart of mail combining processing according to a third embodiment of the present invention.

According to a third embodiment, the "combination rule" according to the first embodiment and that according to the second embodiment are combined, in order to select mails to be combined among stored mails. Thereby, contents of conversation are considered more, and accuracy of selection of a series of related mails can be improved. FIG. 5 is an exemplary flowchart of mail combining processing according to the third embodiment of the present invention.

First, at step S31, the determination unit 150 determines whether the mails satisfy the predetermined condition (whether the predetermined event is detected). If the condition is satisfied, the mail processing unit 132, at step S32, determines whether there are a plurality of mails with the same other party as a recipient or a sender in the inbox and the outbox. Since the step S31 and step S32 are the same process as corresponding steps in the first embodiment, descriptions thereof are omitted. If it is determined at step S32 that there are a plurality of mails with the same other party as a recipient or a sender in the inbox and the outbox, the mail processing unit 132 shifts to step S33 to determine whether the mails with the same other party as a recipient or a sender have the same subjects (titles). If it is determined that the mails with the same other party as a recipient or a sender have the same subjects, the mail processing unit 132 shifts to step S34 to determine whether subjects (titles) of the mails meeting the combination rule are Untitled (non title).

The mail processing unit 132 shifts to step S37, if it is determined at step S34 that the subjects of the mails which have the same subjects are Untitled, or if it is determined at step S33 that the mails with the same other party as a recipient or a sender have different subjects. If it is determined at step S33 that the mails have different subjects (titles), the mail processing unit 132, at step S37, determines whether these mails are exchanged within a predetermined time. In addition, if it is determined at step S34 that the same subjects (titles) are Untitled, the mail processing unit 132, at step S37, determines whether these mails with subject of Untitled are exchanged within the predetermined time. Since steps S33, S34 and S37 are the same as steps S22, S23 and S26 in the second embodiment, respectively, descriptions thereof are omitted.

If it is determined at step S34 that the subjects are not Untitled, or if it is determined at step S37 that the mails are exchanged within the predetermined time, the mail processing unit 132 combines and stores the mails meeting the combination rule, and then deletes the original mails (steps S35, S36).

Figure 8:
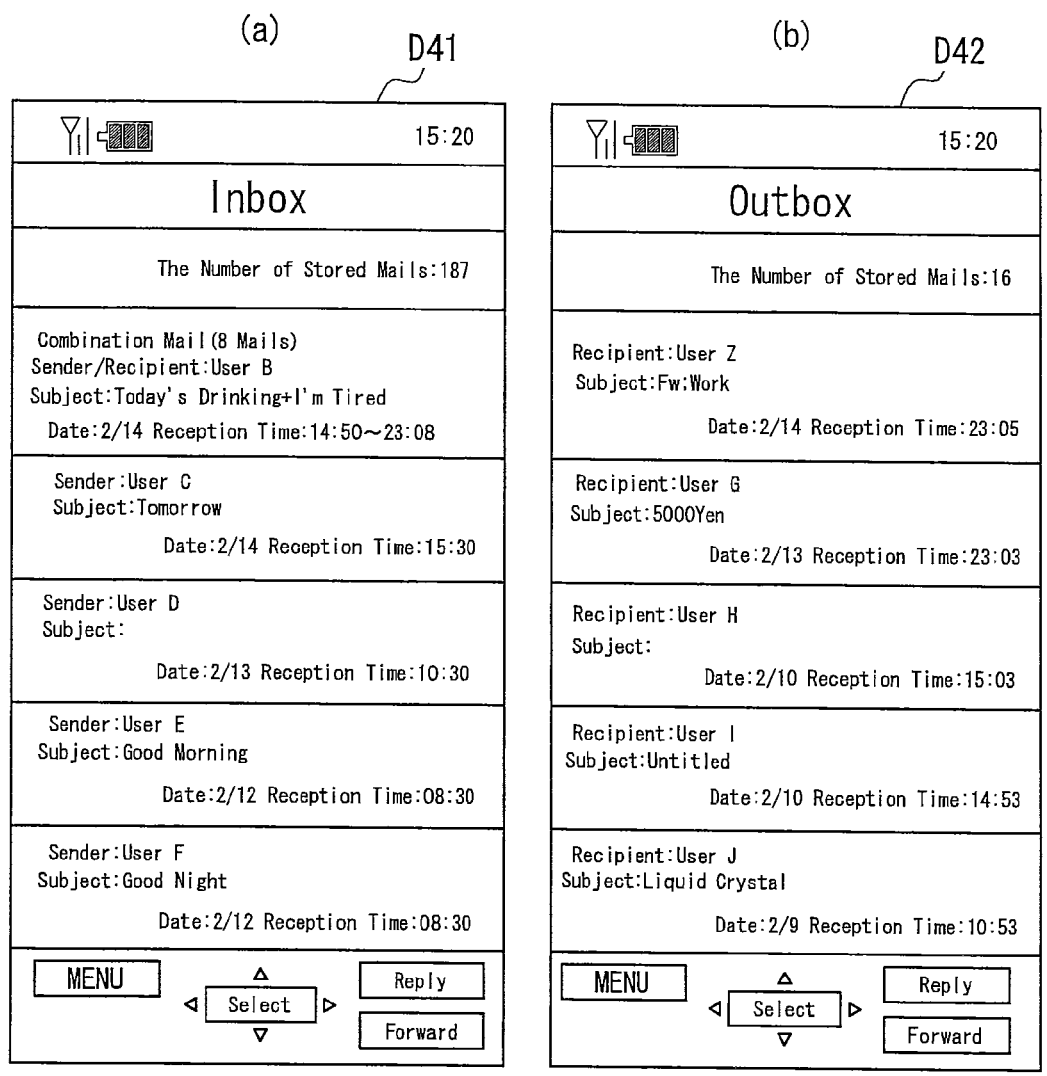
FIG. 8 is a diagram illustrating yet another specific example of the mail combining processing.

Here, the third embodiment is described with reference to a specific example. FIG. 6 to FIG. 8 illustrate specific examples of the mail combining processing. FIG. 6 is a diagram illustrating mails with the "user B" as a recipient or a sender, surrounded by the hatching in FIG. 2, before the mail combining processing is carried out. In the figure, display screens are denoted by D21 to D28 in order of mails exchanged. In the present example, it is assumed that the "predetermined time" at step S37 is set to one day by the user.

First, at step S32, the mails with the same "user B" as a recipient or a sender, surrounded by hatching in FIG. 2, are selected as shown in FIG. 6. Next, it is determined at step S33 that the mails on the display screens D21 to D25 in FIG. 6 have the same subjects, and it is determined at step S34 whether the subjects are Untitled. Since the subjects of mails on the display screens D21 to D25 are not Untitled, they are candidates to be combined at step S35. In contrast, it is determined at step S33 that the mail on the display screen D26 in FIG. 6 has a different subject, and thus it is determined at step S37 whether the mail is exchanged within the predetermined time. In the example in FIG. 6, since the mail on the display screen D26 is exchanged within 1 day of "Feb. 14, 2008", it is a candidate to be combined at step S35.

In addition, it is determined at step S33 that the mails on the display screen D27 and D28 in FIG. 6 have the same subjects, and it is determined at step S34 that their subjects are Untitled. Accordingly, it is determined at step S37 whether the mails on the display screens D27 and D28 are exchanged within the predetermined time. Since the mails on the display screens D27 and D28 in FIG. 6 are exchanged within 1 day of "Feb. 14, 2008", they are candidates to be combined at step S35. Through above steps, the mails on the display screens D21 to D28 in FIG. 6 are combined as related mails at step S35 and stored as a single combination mail in the memory unit 120. In addition, the mails on the display screens D21 to D28 are deleted from the memory unit 120 at step S36.

FIG. 7 shows examples of mails (combination mails) combined into a single mail. FIG. 7 shows a combination of the mails on the display screens D21 to D28 in FIG. 6. As shown in the figure, it is preferred that the combination mail shows the recipient and the sender, transmission and reception date as well as a time started and a time ended, and the tile, and the contents of the mails are arranged in the order of correspondence. FIG. 7(a) shows a display state showing all contents of the combined mails, whereas FIG. 7(b) shows a display state showing only the recipient and the sender, transmission and reception date and time and the subjects. In the display state in FIG. 7(b), it is preferred to allow the user to view contents of a mail by selecting the mail with a subject focused (indicating that the subject is selectable by intensifying it in a different color or highlighting, or changing a shape of a cursor on it), for example.

FIG. 8 shows examples of display screens of the inbox and the outbox after the mails are combined. In this case shown in FIG. 8, the combination mail is displayed with information accordingly (indication of "combination mail", the number of combined mails, sender and recipient, subject, date and reception time) and stored in the inbox. As can be seen from a comparison between the inbox and the outbox before the mails are combined as shown in FIG. 2 and those boxes in FIG. 8, the mails with the "user B" as the recipient or the sender before being combined are deleted from each of the boxes as shown by display screens D41 and D42. Accordingly, there are 3 less mails in the inbox and 4 less mails in the outbox, in comparison with those before the mails are combined. The combination mail may be stored in the outbox or the inbox, or a storage box prepared exclusively for combination mails.

Now, advantages of the present invention are stated once again. According to the mail reception apparatus and the mail reception method of the present invention as described above, it is possible to store more contents of necessary mails even if only a limited number of mails can be stored. In addition, it is also possible for the user to easily review a series of mails.

Although the present invention is described based on the figures and the embodiments, it is to be understood that those skilled in the art may easily vary or modify in a multiple manner based on disclosure of the present invention. Accordingly, it should be noted that such variation and modification are included in a scope of the present invention. For example, a function and the like included in each unit, each step or the like can be rearranged avoiding a logical inconsistency and a plurality of components or steps may be combined or divided. For example, although the "combination rule" includes "associated with the same other party as a recipient or a sender" according to the third embodiment, the present invention is not limited thereto. That is, it is possible to select a series of related mails by defining the "combination rule" as "including the same character string in a subject" alone. In addition, an arbitrary combination of the "combination rules" described in dependent claims can improve accuracy in selecting a series of related mails.

Moreover, although received mails and transmitted mails are combined in the above embodiments, the present invention is not limited thereto. There are more received mails than transmitted mails, if the user transmits (by simultaneous transmission or the like, for example) mails with the same subjects to a plurality of corresponding parties and receives a response from each of them. Therefore, it is possible to combine a series of related mails by applying the combination rule only to the received mails. Accordingly, the present invention is fully effective even if only received mails are involved. It is possible to improve the effectiveness by including transmitted mails as described in the above embodiments. In addition, the predetermined event may include detection of a user's input to carry out the combining processing.

REFERENCE SIGNS LIST 100 mobile terminal
110 transmission and reception unit
112 mail reception unit
114 mail transmission unit
120 memory unit
122 received mail memory unit
124 transmitted mail memory unit
126 threshold memory unit
130 control unit
132 mail processing unit
140 timing unit
150 determination unit
152 mail number determination unit
154 time determination unit
ANT antenna
KEY input operation unit
DIS display unit
SP speaker
D11~D42 display screen

The invention claimed is:

1. An e-mail reception apparatus, comprising:
a reception unit for receiving an e-mail;
a memory unit for storing the e-mail received by the reception unit; and
a control unit, if detecting a predetermined event, for controlling to combine e-mails meeting a combination rule among the e-mails stored in the memory unit, to store a combination e-mail in the memory unit and to delete original e-mails,
wherein the combination rule comprises a rule for combining e-mails of non-title received within a predetermined period.

2. The e-mail reception apparatus according to claim 1, wherein the predetermined event is an event to detect that a number of e-mails stored in the memory unit exceeds a predetermined number.

3. The e-mail reception apparatus according to claim 1, wherein the predetermined event is an event occurred at every predetermined time.

4. The e-mail reception apparatus according to claim 1, further comprising a transmission unit for transmitting an e-mail, wherein the memory unit further stores the e-mail transmitted by the transmission unit, and the control unit controls to combine e-mails meeting the combination rule, among transmitted and received e-mails stored in the memory unit, to store a combination e-mail in the memory unit and to delete original e-mails.

5. The e-mail reception apparatus according to claim 1, wherein the combination rule further comprises one or more of a rule for combining e-mails in association with a particular other party and a rule for combining e-mails including a same character string in subjects.

6. An e-mail reception method comprising the steps of:
receiving an e-mail;
storing the e-mail received at the step of receiving; and
combining, if a predetermined event is detected, e-mails meeting a combination rule among the e-mails stored at the step of storing, storing a combination e-mail, and deleting original e-mails,
wherein the combination rule comprises a rule for combining e-mails of non-title received within a predetermined period.

7. The e-mail reception method according to claim 6, wherein the combination rule further comprises one or more of a rule for combining e-mails in association with a particular other party and a rule for combining e-mails including a same character string in subjects.

8. An e-mail reception apparatus, comprising:
a reception unit for receiving an e-mail;
a memory unit for storing the e-mail received by the reception unit; and
a control unit for controlling to combine e-mails meeting a combination rule among the e-mails and to delete original e-mails,
wherein the combination rule comprises a rule for combining e-mails of non-title received within a predetermined period.

9. The e-mail reception apparatus according to claim 8, wherein the combination rule further comprises one or more of a rule for combining e-mails in association with a particular other party and a rule for combining e-mails including a same character string in subjects.

* * * * *